Figure 1:
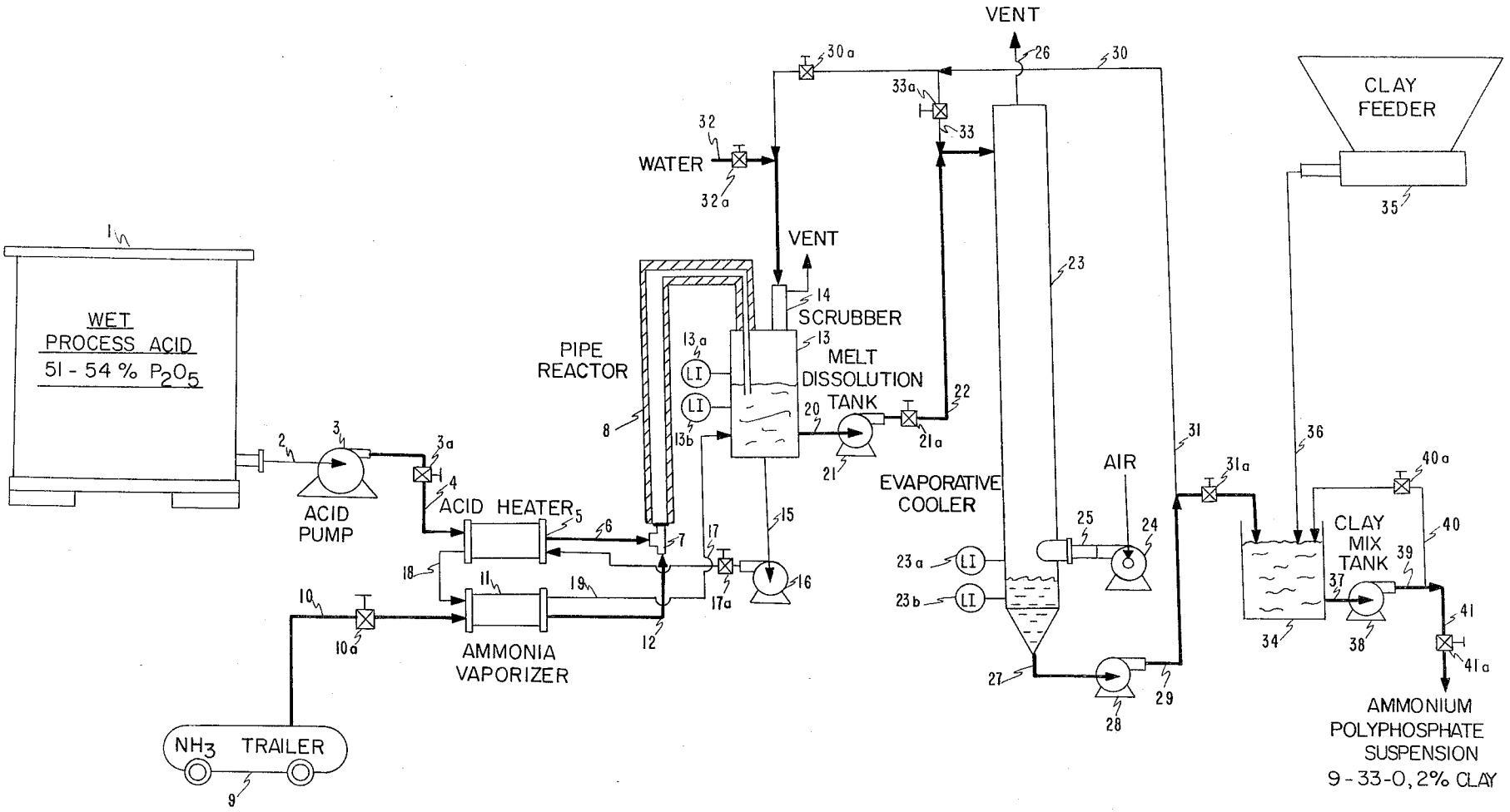
Figure 2:
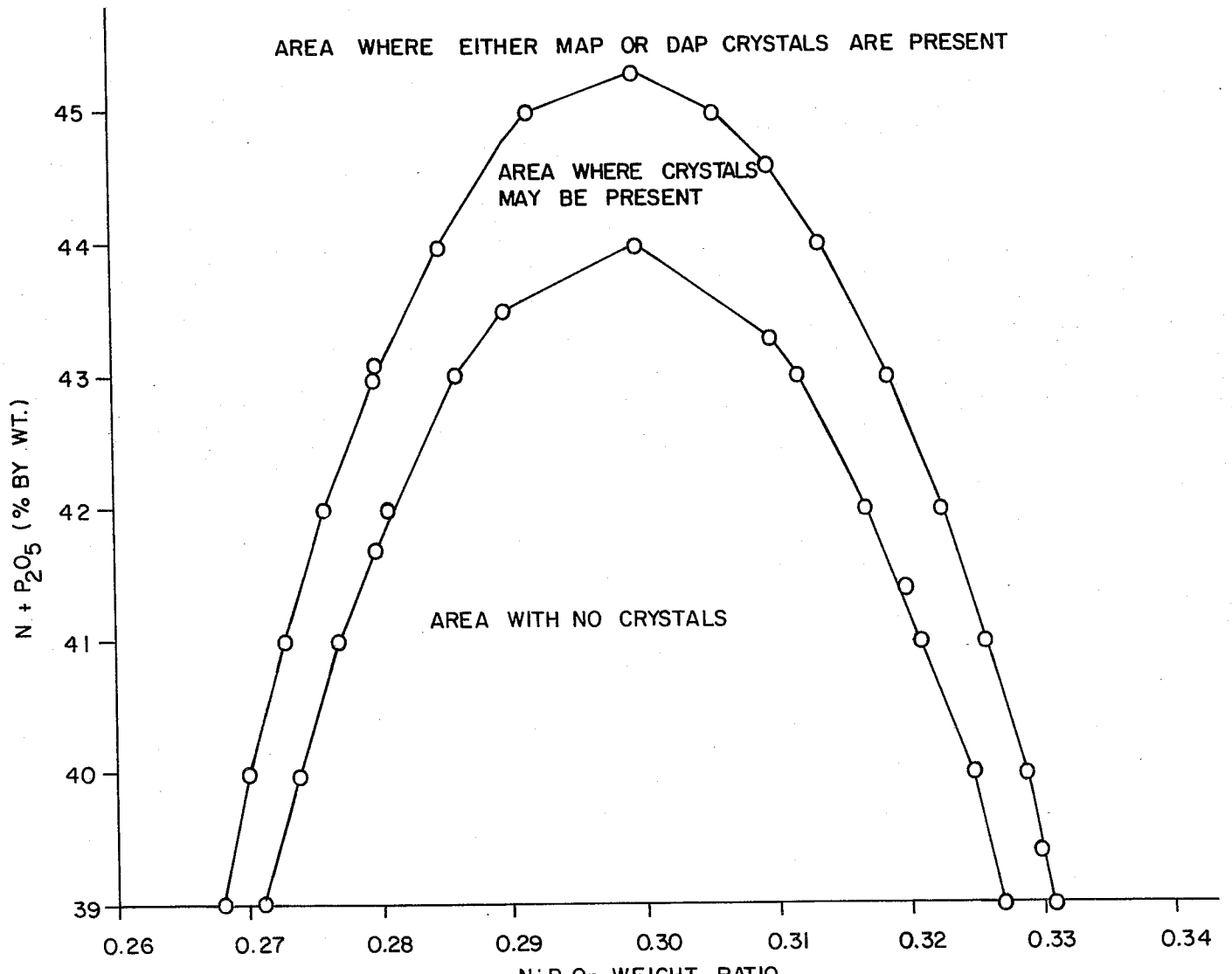
Figure 3:
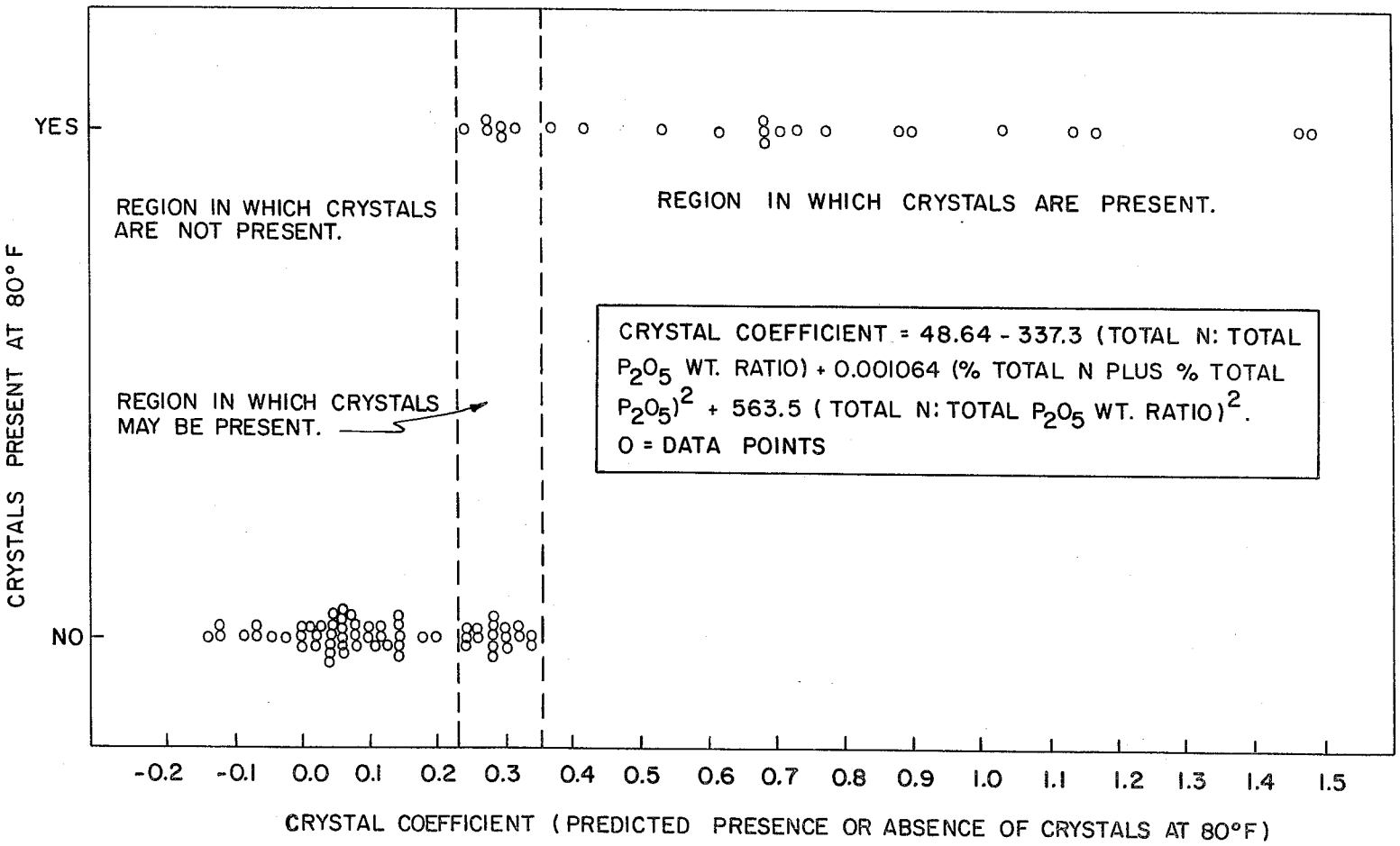

United States Defensive Publication [19] (H) [11] T101,802

Mann, Jr. et al. [43] May 4, 1982

[54] LOW POLYPHOSPHATE SUSPENSION FERTILIZERS FROM WET-PROCESS ACID

[76] Inventors: Horace C. Mann, Jr., Box 345, Rte.4, Killen, Ala. 35645; Robert S. Meline, 310 McKinley Ave., Florence, Ala. 35630

[21] Appl. No.: 194,642

[22] Filed: Oct. 6, 1980

[51] Int. Cl.[3] ..... C05B 7/00

[52] U.S. Cl. ..... 71/34; 71/41; 71/43; 422/260

[57] ABSTRACT

An energy efficient process and apparatus is described that consists of a pipe reactor, melt dissolution tank, acid and ammonia heat exchangers, product cooler, and clay addition facilities in which a concentrated polyphosphate containing ammonium phosphate suspension fertilizers is produced that can be stored and handled at temperatures well below 0° F. The suspension is produced from merchant-grade wet-process phosphoric acid which is ammoniated in a unique enlarged pipe-type reactor sized to have throughputs of 20–100 pounds $P_2O_5$/hr-in$^2$ and 0.25–2 pounds $P_2O_5$/hr-in$^3$ of internal reactor area and volume, respectively, and which can be operated for extended periods without clogging. All of the heat required by the process is obtained by transferring a portion of the heat of ammoniation from the hot liquid in the melt dissolution tank to the incoming acid and ammonia streams. The resultant product contains 10 to 40 percent polyphosphate and when produced within an $N:P_2O_5$ weight ratio range of 0.265–0.335 and when containing 40–47 percent $N+P_2O_5$, has excellent low temperature storage and handling properties. Operation outside the specified composition range will reduce the maximum plant food concentration possible and may cause some of the ammonium phosphate salts to crystallize and foul the heat-transfer surfaces.

8 Claims, 3 Sheets Drawing,

34 Pages Specification

The file of this unexamined application may be inspected and copies thereof may be purchased (849 O.G. 1221, Apr. 9, 1968).

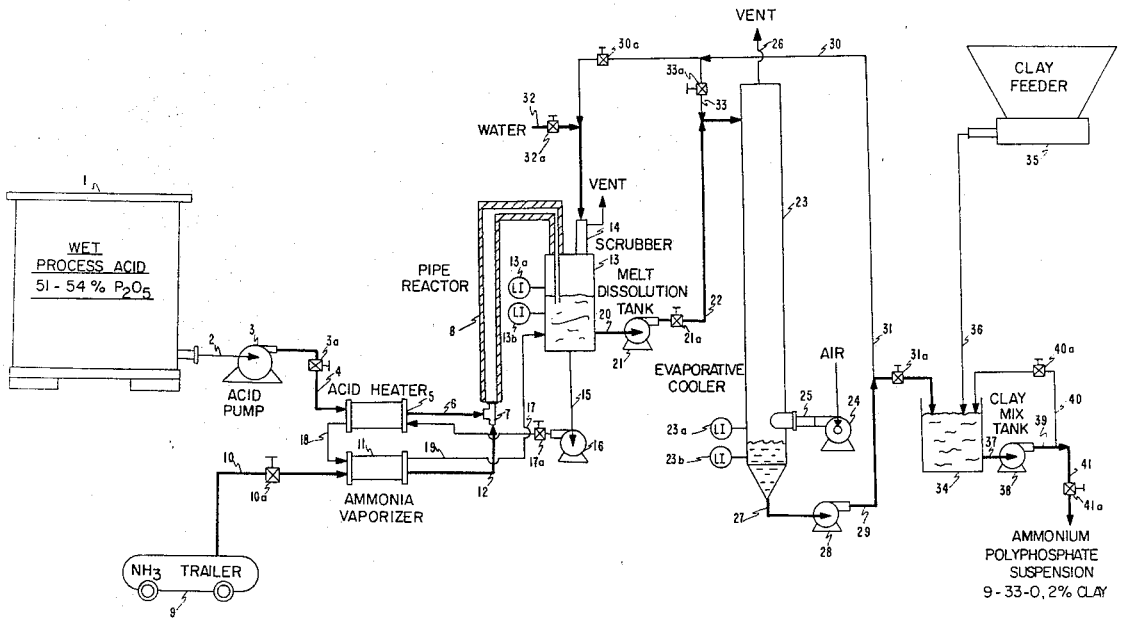

AMMONIUM POLYPHOSPHATE SUSPENSION FERTILIZER FROM MERCHANT-GRADE WET-PROCESS ACID

AMMONIUM POLYPHOSPHATE SUSPENSION FERTILIZER FROM MERCHANT-GRADE WET-PROCESS ACID

SOLUBILITY OF LOW POLY AMMONIUM POLYPHOSPHATE SUSPENSIONS AT 80°F

EQUATION TO PREDICT PRESENCE OF CRYSTALS IN APP SUSPENSIONS